March 12, 1940.   A. E. MARSHALL   2,193,635
METHOD OF MAKING COMPOSITE STRUCTURES
Filed Jan. 15, 1938
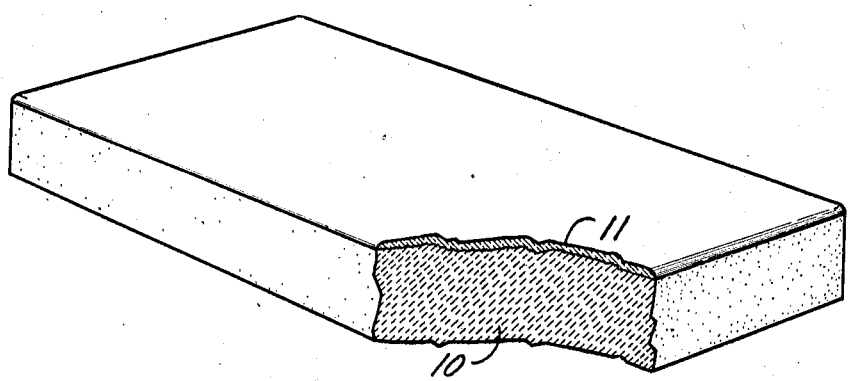
Albert E. Marshall
INVENTOR
BY Marshall & Marshall
ATTORNEYS Patented Mar. 12, 1940

2,193,635

UNITED STATES PATENT OFFICE 2,193,635

METHOD OF MAKING COMPOSITE STRUCTURES

Albert E. Marshall, New York, N. Y., assignor to Plaskon Company, Incorporated, Toledo, Ohio, a corporation of Ohio Application January 15, 1938, Serial No. 185,166

4 Claims. (Cl. 18—60)

The invention relates to the manufacture of composite structures, in particular to the production of tile without kiln firing.

The kiln firing operation heretofore employed in the production of tile is expensive and time-consuming. Moreover, it is very difficult to produce tiles with matched colors by kiln firing methods.

The principal object of the invention is the production without kiln firing of tile the color of which can be exactly controlled, and the surface water-resistance and durability of which are equal to that of kiln-fired tile.

More specific objects and advantages are apparent from the description in which reference is had to the accompanying drawing illustrating a tile embodying the invention.

The drawing is a perspective view partly in section of a tile embodying the invention. This specific drawing and the specific description that follows are to disclose and illustrate the invention, and are not to impose limitations on the claims.

In accordance with the invention the body portion of the composite structure is cast from a calcium sulphate cement capable of giving a high tensile strength. Gypsum cements, in particular, can be obtained which have an extremely high tensile strength in the set body, and a relatively high resistance to water. Slurries made from these cements and water, set without change in volume, so that a set can be obtained in a mold under hydraulic pressure to produce bodies, such as tiles, that have a tensile strength of 1,000 to 1,400 pounds per square inch. Even when set without pressure they produce tiles with a tensile strength of 800 to 900 pounds per square inch.

A resistant, enamel-like coating is produced upon a surface of a body cast from one of these cements, such as the face of a tile 10, by applying thereon a layer 11 comprising a thermosetting resin of the formaldehyde urea type and then finishing the coating by converting the resin to its thermo-set state by hot-pressing and (simultaneously) forming an interlocking bond which permanently joins the coating to the surface of the cast body.

Cellulose particles may be incorporated with the resin to improve the properties of the coating, and coloring matter may be used to give a coating of the exact color desired.

Because of the low heat transfer coefficient of the cast body it is preferable that only the coated surface of the body be heated to the temperature required for the molding of the resin. Applying heat only to the coated surface speeds up production and insures that the resin will be at exactly the proper temperature during the molding and curing of the resin under pressure. In the molding of bodies containing formaldehyde urea resin difficulty is experienced in producing a proper cure of the resin unless the body is thin enough so that it can easily be heated to a uniform temperature. Application of heat only to the coated surface of the cast body, in accordance with the present invention, makes it possible to obtain without difficulty proper curing of all the resin present.

Although various reaction products, such as formaldehyde urea syrups, may be employed, the most satisfactory results are obtained when the resin that is used for incorporation in the coating is in the form of a molding powder. Any liquid that is used in making up the coating layer should be one in which the powder is substantially insoluble.

In the production of articles embodying the invention the coating layer may be applied after the cement in the supporting body has been set with or without pressure, or before the setting of the cement. In any case the cement in the supporting body should be set before the molding of the coating under heat and pressure. Before the application of heat and pressure to finish the coating, the coating layer should be dried.

When a coating layer is added on top of a slurry in a mold before the slurry has set, the layer preferably contains a slurry of a calcium sulphate cement in addition to the resin and other ingredients.

A preferred procedure for making composite tile in accordance with the invention is as follows: A solution of urea and formalin is prepared in which the molecular proportions of formaldehyde to urea are between 1.1:1 and 2:1, and preferably about 1.5:1. The pH of the solution is adjusted to a standard value near neutrality, and the solution is allowed to stand while an additional reaction between the urea and formaldehyde takes place, the temperature of the solution being kept below 60° C. to inhibit the premature formation of insoluble compounds. The time required for the reaction depends upon the temperature at which the solution is maintained, and the solution at the end of the reaction is in the form of a thin syrup. Cellulose, preferably in the form of shredded paper or pulp, is then stirred with the solution until thorough and uniform absorption of the solution by the cellulose has been obtained. At this stage the acidity of the mass may be increased somewhat. After the stirring of the mass, the material is dried at temperatures progressively increasing to a maximum of 100° C., the time of drying being sufficient for the reduction of the moisture content of the mass to less than 10 per cent. After the drying, the resin is in condensed form with molecules of water split off, and the dry material is ground to a fine powder in a ball mill. Various substances may be incorporated during the grinding, such as opacifiers, hot plate lubricants, accelerators, retarders and pigments, to produce the desired appearance and characteristics in the molded surface. Decorative substances other than ordinary pigments, such as metallic and metal simulating powders or flakes, glass and mica flakes, and thermally set colored resin powders and flakes may also be incorporated by suitable mechanical mixing means after grinding to produce decorative molded surfaces.

In the resulting powder the ratio by weight of resin to cellulose should be between 3:1 and 1:2, and preferably 2:1. The resin in the powder is substantially insoluble in water.

Sufficient gypsum cement slurry is then poured into a mold to form the body of the tile. After the slurry has been leveled off, a layer is added on top of the slurry made from a major proportion of the ground powder containing the resin, and a minor proportion of gypsum cement slurry. The cement takes about 20 minutes to acquire its initial set.

After the cast piece has been dried it may be finished by molding the surface layer under heat and pressure. The flow properties and curing time of the resin in the coating layer may be adjusted by varying the proportion of cellulose, and by the use of plasticizers, accelerators and retarders in the usual manner.

The embodiments of the invention that have been disclosed may be modified to meet various requirements.

Having described my invention, I claim:

1. A method of making composite structures that comprises placing in a mold a slurry of a gypsum cement capable of giving a high tensile strength, adding a layer comprising a thermosetting formaldehyde urea resin, allowing the slurry to set and converting said layer into a water-resistant enamel-like coating by hot-pressing.

2. A method of making composite tile that comprises placing in a mold a slurry of a gypsum cement capable of giving a high tensile strength, adding a layer comprising cellulose particles, a thermosetting formaldehyde urea resin and a decorative substance, allowing the slurry to set, and converting said layer into a water-resistant enamel-like coating by hot-pressing.

3. A method of making composite tile that comprises placing in a mold a slurry of a gypsum cement capable of giving a high tensile strength, adding a layer comprising a thermosetting formaldehyde urea resin and a slurry of a gypsum cement, allowing the cement to set, drying said layer, and converting said layer into a water-resistant enamel-like coating by hot pressing.

4. A method of making composite structures that comprises placing in a mold a slurry of a gypsum cement capable of giving a high tensile strength, adding a layer comprising a formaldehyde urea molding powder that is substantially insoluble in water and a slurry of a gypsum cement, allowing the cement to set, drying said layer, and converting said layer into a water-resistant enamel-like coating by hot pressing.

ALBERT E. MARSHALL.